United States Patent [19]

Swann et al.

[11] Patent Number: 5,713,118
[45] Date of Patent: Feb. 3, 1998

[54] APPARATUS FOR POSITIONING AN ELEMENT ON A SURFACE

[75] Inventors: George R. Swann, Gibsonia; Eric R. Moore, Pittsburgh, both of Pa.

[73] Assignee: Chick Machine Tool, Inc., Warrendale, Pa.

[21] Appl. No.: 690,031

[22] Filed: Jul. 31, 1996

Related U.S. Application Data

[63] Continuation of Ser. No. 300,375, Sep. 2, 1994, abandoned, which is a continuation-in-part of Ser. No. 192,431, Feb. 7, 1994, abandoned, which is a continuation of Ser. No. 955,361, Oct. 1, 1992, abandoned.

[51] Int. Cl.$^6$ ............................................. B23Q 3/00
[52] U.S. Cl. ........................ 29/283; 29/560.1; 29/464; 269/900
[58] Field of Search ..................... 29/560.1, 281.1, 29/281.6, 283, 464, 525.1, 525.01, 564.1; 269/88, 95, 900

[56] References Cited

U.S. PATENT DOCUMENTS

| | | | |
|---|---|---|---|
| 2,560,413 | 7/1951 | Carlson | 29/464 |
| 2,868,339 | 1/1959 | Lazarowicz | 29/464 |
| 2,889,396 | 6/1959 | Bode et al. | 29/464 |
| 4,017,267 | 4/1977 | Hawley | 29/525.1 X |
| 4,089,613 | 5/1978 | Babbitt, Jr. | 403/388 |
| 4,121,817 | 10/1978 | Pavlovsky | 269/296 |
| 4,496,165 | 1/1985 | Schrekeis et al. | 269/900 X |
| 4,585,217 | 4/1986 | Erickson | 269/56 |
| 4,711,437 | 12/1987 | Longenecker et al. | 269/91 |
| 4,834,358 | 5/1989 | Okolischan et al. | 269/309 |
| 4,966,350 | 10/1990 | Chick | 267/154 |
| 4,968,012 | 11/1990 | Haddad et al. | 269/88 |
| 4,974,308 | 12/1990 | Nimberger | 29/525.1 |
| 5,129,637 | 7/1992 | Ito et al. | 269/231 |

*Primary Examiner*—Peter Vo
*Assistant Examiner*—Khan Nguyen
*Attorney, Agent, or Firm*—Kirkpatrick & Lockhart LLP

[57] ABSTRACT

Apparatus for attaching a member onto a planar surface of an object within a predetermined degree of positioning accuracy relative to a reference axis on the planar surface. The apparatus comprises first and second bores in the object that are spaced a predetermined distance apart on the reference axis such that their respective centers extend substantially perpendicularly through the reference axis. First and second hollow protrusions are formed on a mating surface of the member and are spaced apart on the mating surface a second predetermined distance and are shaped such that the second predetermined distance can vary a predetermined amount relative to the first predetermined distance without affecting the ability to simultaneously insert the first and second protrusions into the first and second bores, respectively, while maintaining the degree of positioning accuracy of the member relative to the reference axis on the planar surface on the object.

10 Claims, 8 Drawing Sheets

APPARATUS FOR POSITIONING AN ELEMENT ON A SURFACE

This is a continuation of Ser. No. 300,375, Sept. 2, 1994, abandoned, which is a continuation-in-part application of U.S. patent application Ser. No. 08/192,431, filed Feb. 7, 1994, now abondoned, which is a continuation of U.S. patent application Ser. No. 07/955,361, filed Oct. 1, 1992, now abandoned.

BACKGROUND OF THE INVENTION

1. Field of the Invention

The present invention relates to workholding apparatuses and, more particularly, is directed to apparatus for positioning a stationary clamping element on a precision vise-like workholder.

2. Description of the Invention Background

There are a number of known methods for accurately positioning a member on a surface of an object. For example, FIGS. 1 and 2 illustrate a known method for positioning a member 212 on an object 214 having a planar surface 216. As shown in FIGS. 1 and 2, two spaced-apart, round pins 218 are attached to the member 212 such that they extend therefrom to be received in corresponding round holes 220 provided in the object 214. To ensure that the pins 218 can be inserted into the holes 220, the distance "X" between the centers of the pins 218 and the distance "Y" between the centers of the holes 220 must be precisely controlled so that those distances are substantially equal. Such precision machining is costly and time consuming. As such, to accommodate slight variations between those distances, which can result in misalignments between the pins 218 and the holes 220, the holes 220 are typically fabricated with larger diameters than the outside diameters of the pins 218. However, that action can lead to positioning inaccuracies depending upon the magnitude of the clearance provided between the pins 218 and their corresponding holes 220. Also, to fasten the member 212 to the object 214 separate threaded bore(s) (not shown) are typically provided in the object 214 that are adapted to receive corresponding capscrew(s) (not shown) that extend through bores (not shown) provided in the member 212. Such fastening arrangement requires the clearances between the threaded capscrew and the in member 212 bore to be larger than the tolerances between the pins 218 and the bores 220 to ensure that the positioning of the member 212 relative to the object is solely controlled by the pin and bore arrangement.

Another known positioning method for positioning an object 312 on a member 314 having a planar surface 316 is illustrated in FIGS. 3 and 4. When using that method, two round holes 320 are provided in the object 314. A round pin 318 and a "diamond" shaped pin 322 are attached to the object 312 such that they extend therefrom. Such diamond shaped pins 322 typically have their lower end portions configured to a so-called diamond shape by machining the cylindrical surface of the pin on opposite sides, leaving only small arcs spaced on opposite sides on the pin at the original diameter of the pin. Slight variations between the distance "X" between the centers of pin 318 and diamond shaped pin 322 and the distance "Y" between the centers of the round holes 320 along a reference line "Z—Z" connecting the center points of the bores 320 is largely accommodated by the tapered sides 324 of the diamond shaped pin 322 as long as the line "W—W" connecting the mid-points of the arcuate faces of the diamond pin 322 are substantially perpendicular to line "Z—Z".

Over the years, the above-mentioned positioning methods have been used to locate a fixture or other workholding device on a support member such as a tooling plate or grid plate during high precision machining operations. For example, U.S. Pat. No. 4,585,217 to Erickson teaches the use of differently shaped pins for aligning a tooling block adapted to support one or more workpieces thereon on a planar base plate that is attached to a rotary table of a computer numerically controlled machining device. Two of the pins that are used each have a dome-shaped upper portion and a cylindrical lower stem that is adapted to be received in a corresponding bore in the base plate. The tooling block has at least two alignment bores that are adapted to receive the upper dome-shaped portions of those pins therein to facilitate initial alignment of the block on the base plate. Another pin, having a lower cylindrical stem portion adapted to be received in a corresponding bore in the base plate and an upper portion having a frusto-conical shape adapted to be received in a corresponding bore provided in the block is also used to facilitate alignment of the block on the plate. In addition, another pin that also has a cylindrical lower stem portion adapted to be received in corresponding bore in the plate and a diamond-shaped upper portion adapted to be received in a corresponding bore in the block is used. That collection of pins is used to precisely locate the tooling block on the base plate.

A somewhat similar arrangement of pins is taught in U.S. Pat. No. 4,834,358 to Okolfschan et al. In that device, adapter members are attached to a grid plate and are sized to support a workpiece thereon at a desired height. Locating pins, each having a locating portion and a cylindrical stem portion that is adapted to be received in a corresponding bushing provided in the adapter are provided to locate the workpiece in a predetermined position. The locating portion of each pin is adapted to be received in corresponding bores provided in the workpiece. Each pin may be further provided with a shoulder that cooperates with a corresponding screw arrangement to prevent the pin from rotating in its corresponding bushing. One or more of the pins may be provided with a "diamond" cross-sectional shape.

Both of the locating pin arrangements disclosed in the patents mentioned immediately above have inherent inaccuracy problems. In particular, the locating pins each have cylindrical "stem" portions that, in one case, serve to locate the pins in a base member and, in the other case, serve to locate the pins in an adaptor member that is attached to a base plate. Thus, the degree of positioning accuracy of one member (i.e., a tooling block or a workpiece) relative to the other member (i.e., a base plate or an adaptor attached to a base plate) is directly dependent upon the accuracy of each of the cylindrical pin stems and the corresponding bore in which it is to be received.

Every machining process has a certain amount of inaccuracy associated with it due to, perhaps, limitations of the apparatus used to machine the bore, wear of that apparatus' components or the particular machining method employed. As such, each bore will have a range of diameters (i.e., a tolerance) that could result from that particular machining apparatus or process, each of which would be deemed acceptable, in view of the inherent inaccuracies associated with that apparatus and/or process. Similar inaccuracies are also encountered when machining the cylindrical lower stems of the locating pins. Thus, the accuracy of the pin relative to the first member in which its lower cylindrical stem portion is received will depend upon the accuracy of the pin and the accuracy of the bore into which it is inserted. For example, a pin member having a diameter of 0.500" and a tolerance of ±0.002" that is adapted to be inserted into a bore of 0.504" having a tolerance of ±0.002" could cause the members to be misaligned by as much as 0.004" if the pin diameter is 0.498"and the bore diameter is 0.506".

Likewise, U.S. Pat. No. 4,968,012 to Haddad et al. discloses a modular workpiece holding apparatus for holding a workpiece in a predetermined position. The apparatus includes a base plate that has a plurality of bores therein that each have a lower threaded portion. The apparatus also includes a plurality of support members that each have a mounting base with four bores formed therein. A bushing is secured in each bore in the mounting base such that a portion of each bushing protrudes from its bottom surface. Two bushings that each have a circular exterior portion that protrude from the bottom of the mounting base and two bushings that each have a diamond-shaped exterior portion that protrudes from the mounting base are used to position the mounting base relative to the base plate by inserting the protruding bushings into bores provided in the base plate. The support member is secured to the base plate by threaded fasteners that extend through the bushings to threadedly engage the threaded portion of the bores in the base plate. This arrangement of locating bushings, however, also has the same inaccuracy problems of the pin arrangements that were discussed above. In particular, because the bushings must be inserted into holes provided in the mounting base of each support member, the positioning accuracy of the mounting plate relative to the base plate is dependant upon the accuracy of the outer surfaces of the bushings and the accuracy of the holes in which they are to be inserted.

In view of the foregoing, there is a need for apparatus that can more accurately position an object on the planar surface of a member.

There is a further need for apparatus that can more accurately position stationary clamping elements onto the base member of a precision workholding device.

SUMMARY OF THE INVENTION

In accordance with a preferred form of the present invention, there is provided an apparatus for attaching a member onto a planar surface of an object within a predetermined degree of accuracy relative to a reference axis on the planar surface. The apparatus, in a preferred form, comprises a first receiving bore provided in the planar surface of the object. The first receiving bore has a first central axis that extends substantially perpendicularly through the reference axis. A second receiving bore is also provided in the planar surface of the object. The second receiving bore has a second central axis spaced from the first central axis a first predetermined distance on the reference axis and it extends substantially perpendicularly through the reference axis. A first locating protrusion is formed in a mating surface of the member such that it extends therefrom. The first locating protrusion has a substantially round cross-sectional shape that is sized for insertion into the first receiving bore and also has a first axial bore that extends therethrough. A second locating protrusion is formed in the mating surface of the member and has a second axial center that is spaced a second predetermined distance from the first axial center of the first locating protrusion such that the first and second locating protrusions may be simultaneously inserted into the first and second receiving bores, respectively. The second locating protrusion also has a second axial bore extending therethrough and a non-circular cross-sectional shape configured for insertion into the second receiving bore such that the first and second predetermined distances can vary a predetermined amount while maintaining the ability to simultaneously insert the first and second locating protrusions in the first and second receiving bores, respectively, while also maintaining the degree of positioning accuracy of the object relative to the reference axis on the planar surface. Fastening members are inserted into the first and second axial bores to fasten the object to the member when the first and second locating protrusions are simultaneously received in the first and second receiving bores, respectively.

It is an object of the present invention to provide apparatus for precisely locating a member on an object having a planar surface within acceptable tolerances that could not, necessarily, be achieved using standard machining practices.

It is another object of the present invention to provide means for attaching a fixed jaw member to the base of a vise-like workholder in a location on the base that is within predetermined acceptable tolerances.

Accordingly, the present invention provides solutions to the aforementioned problems discussed above. However, these and other details, objects and advantages will become apparent as the following detailed description of the present preferred embodiment thereof proceeds.

BRIEF DESCRIPTION OF THE DRAWINGS

In the accompanying drawings, there are shown present preferred embodiments of the invention wherein like reference numerals are employed to designate like parts and wherein.

DETAILED DESCRIPTION OF THE PREFERRED EMBODIMENTS

Figure 1:
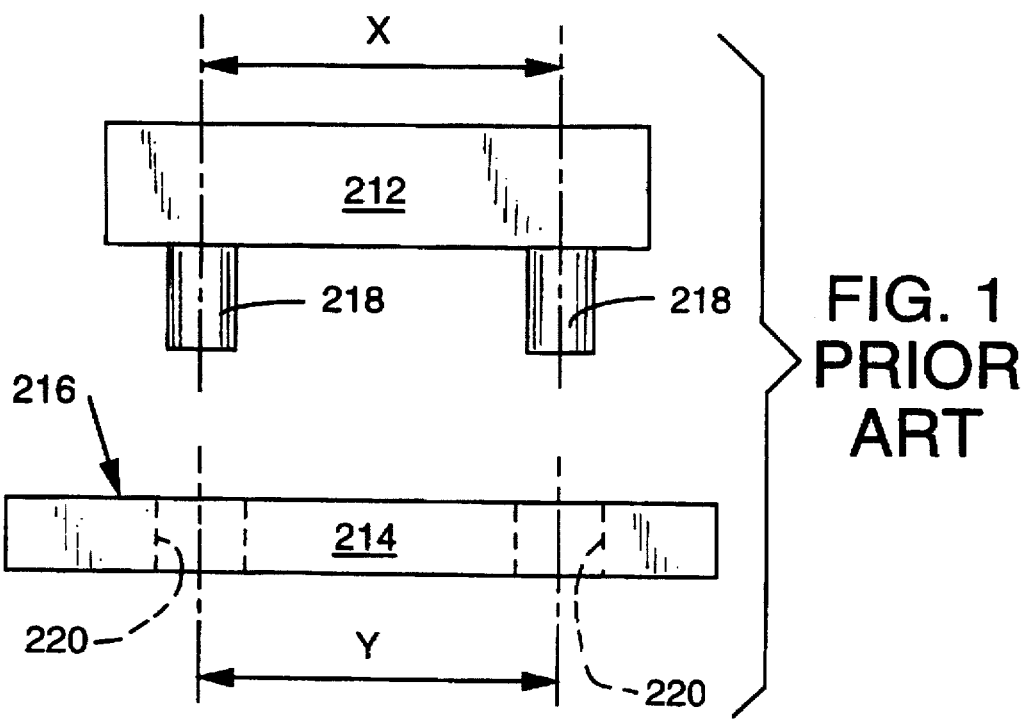
FIG. 1 is an exploded assembly view of a prior method for positioning a member on the planar surface of an object.
Figure 2:
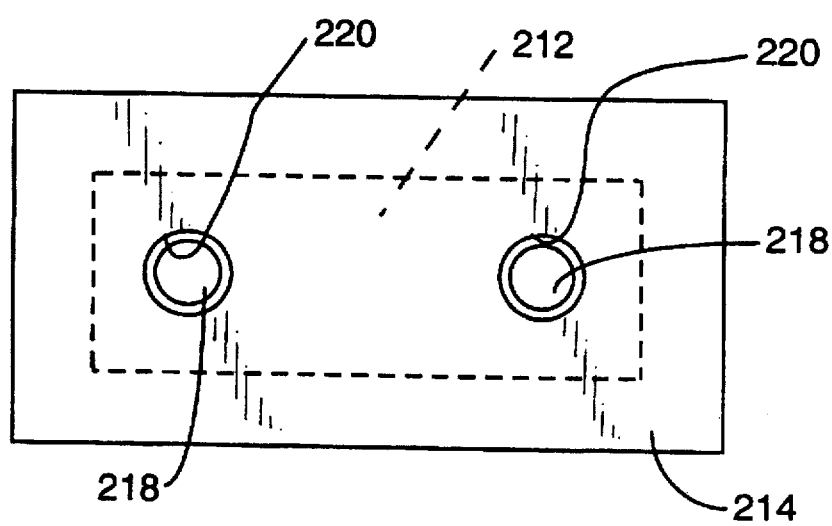
FIG. 2 is a bottom view of the assembly of FIG. 1.
Figure 3:
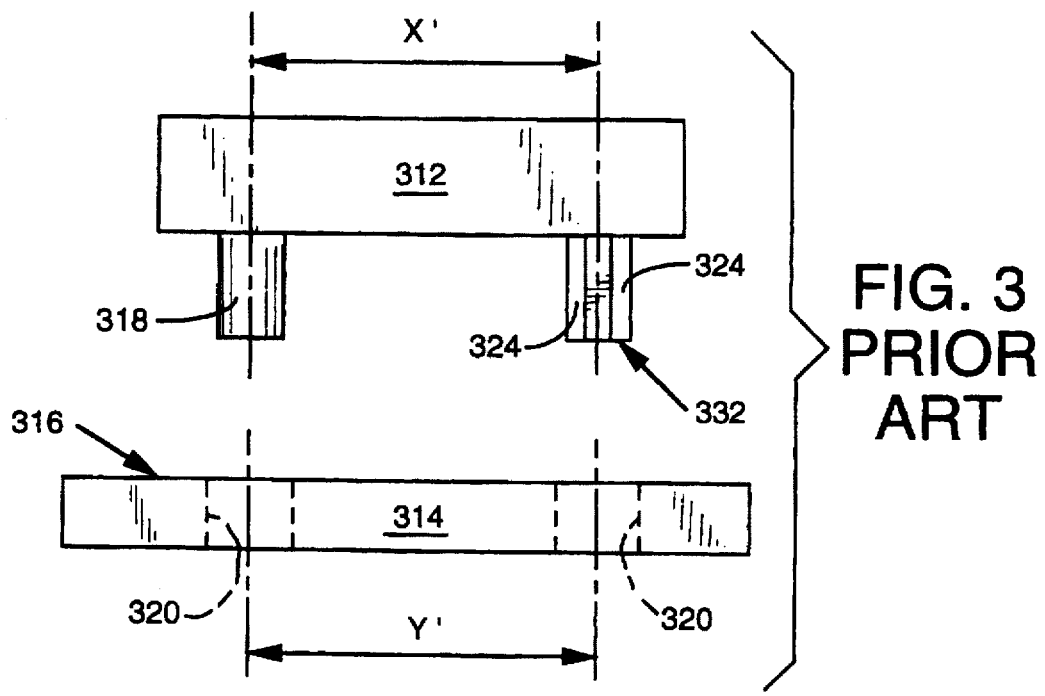
FIG. 3 is an exploded view of another prior method for positioning a member on a planar surface of an object.
Figure 4:
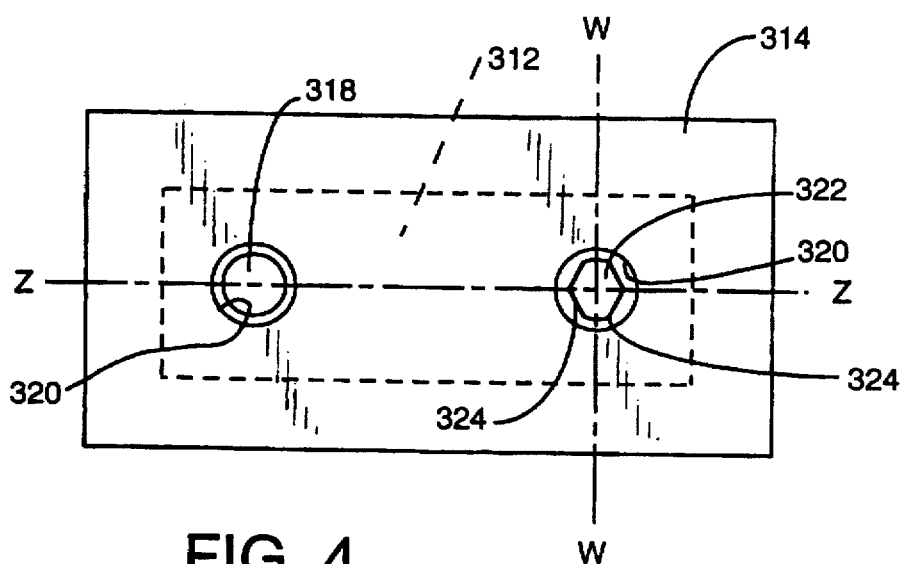
FIG. 4 is a bottom view of the assembly of FIG. 3.
Figure 5:
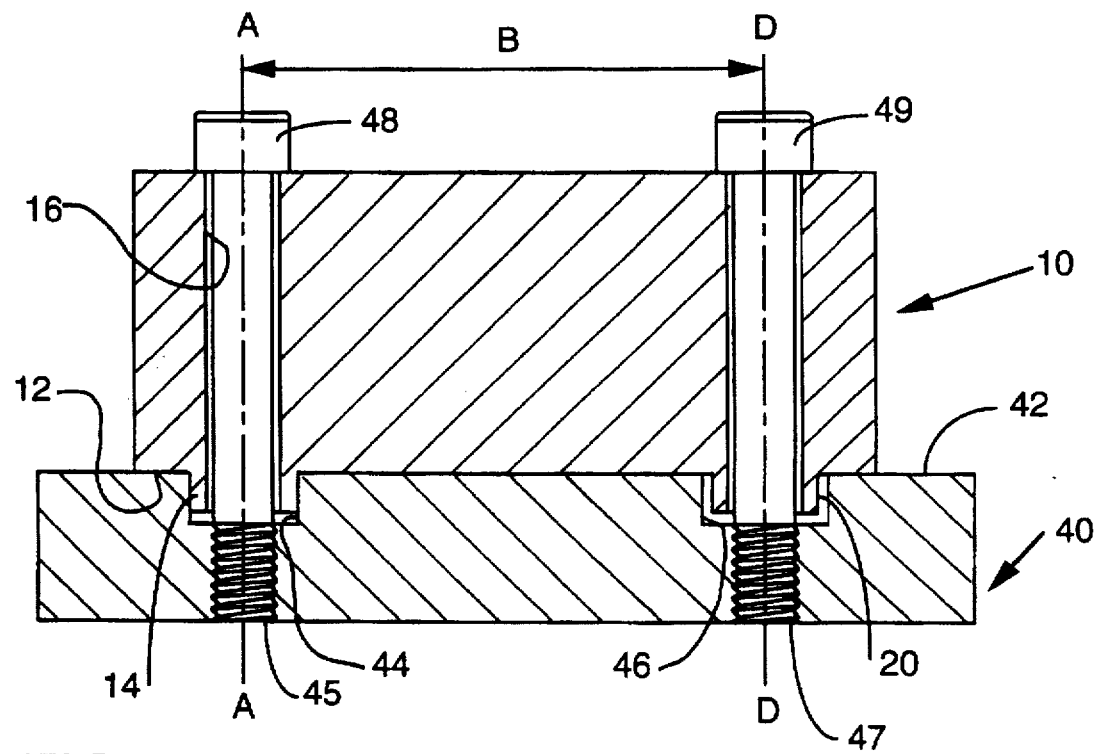
FIG. 5 is cross-sectional assembly view of a member attached to an object using the apparatus of the present invention.
Figure 6:
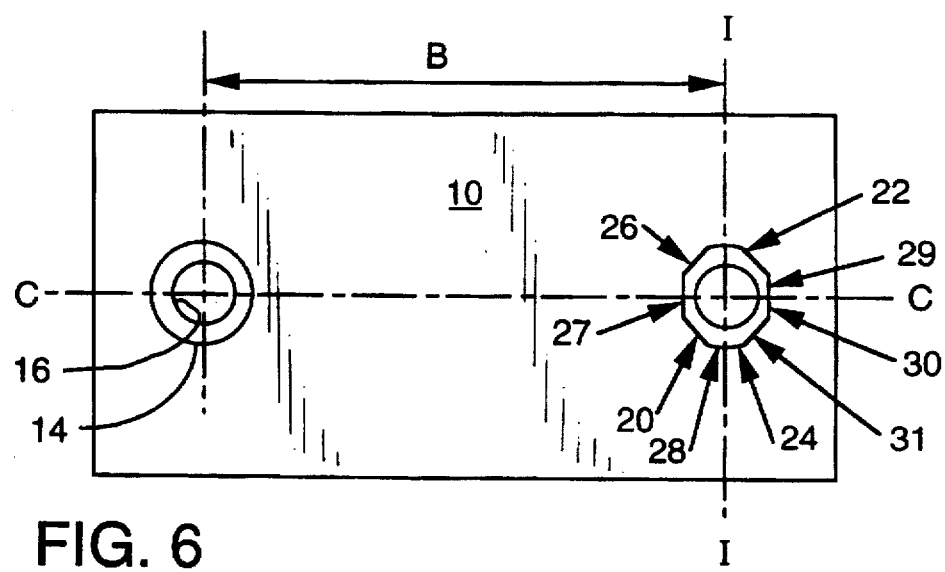
FIG. 6 is a bottom view of the member depicted in FIG. 5.

Referring now to the drawings for the purposes of illustrating the present preferred embodiments of the invention only and not for purposes of limiting the same, FIGS. 5 and 6 illustrate a preferred embodiment of the present invention for precisely positioning a member 10 on a surface 42 of an object 40. It will be appreciated that member 10 may consist of any solid article such as, for example, a stationary clamping member that is adapted to be precisely positioned on a planar surface like a portion of a machine tool or workholding member.

As can be seen in FIG. 5, the member 10 has a mating surface 12 that is adapted to be received on the planar surface 42 of the object 40. A first protrusion 14, preferably having a substantially circular cross-sectional shape, is formed in the mating surface 12 such that it protrudes or extends therefrom. A first bore 16 is provided through the member 10 in a known location such that it is substantially coaxially aligned with the first protrusion 16 along axis "A—A" and extends therethrough in the manner illustrated in FIG. 5.

Spaced a "first" predetermined distance as (generally designated as distance "B") along a common longitudinal axis "C—C" on the mating surface 12 is a second "diamond-shaped" protrusion 20 that has an axis "D—D" that is substantially parallel to axis "A—A" of protrusion 14. In a preferred embodiment, arcuate surfaces (22, 24), each preferably about 20 degrees in length, and in no event greater than 179 degrees in length, are preferably formed diametrically opposite each other as shown in FIG. 6. Interconnected non-arcuate surfaces (26, 27, 28, 29, 30, 31), each being closer to axis "D—D" than the arcuate surfaces (22, 24), are preferably provided intermediate the arcuate surfaces (22, 24) as shown in FIG. 6. The skilled artisan will appreciate, however, that other non-arcuate or arcuate intermediate surface arrangements may also be successfully used depending upon the lengths of arcuate surfaces (22, 24).

Figure 7:
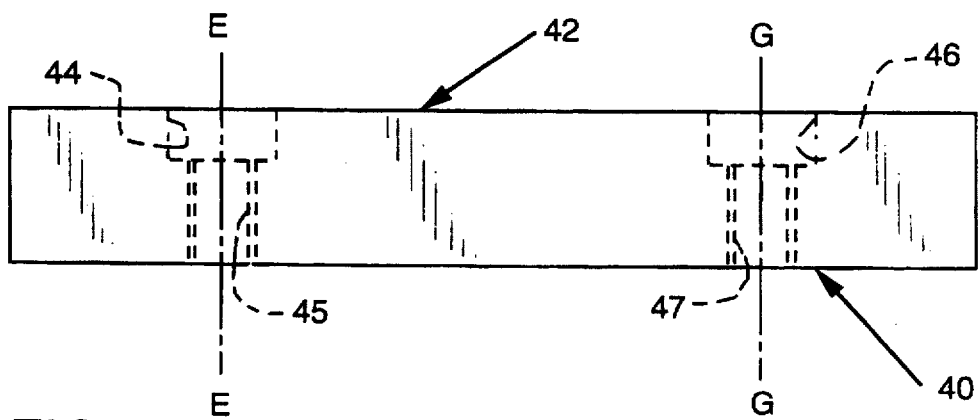
FIG. 7 is a side elevational view of the object depicted in FIG. 5.
Figure 8:
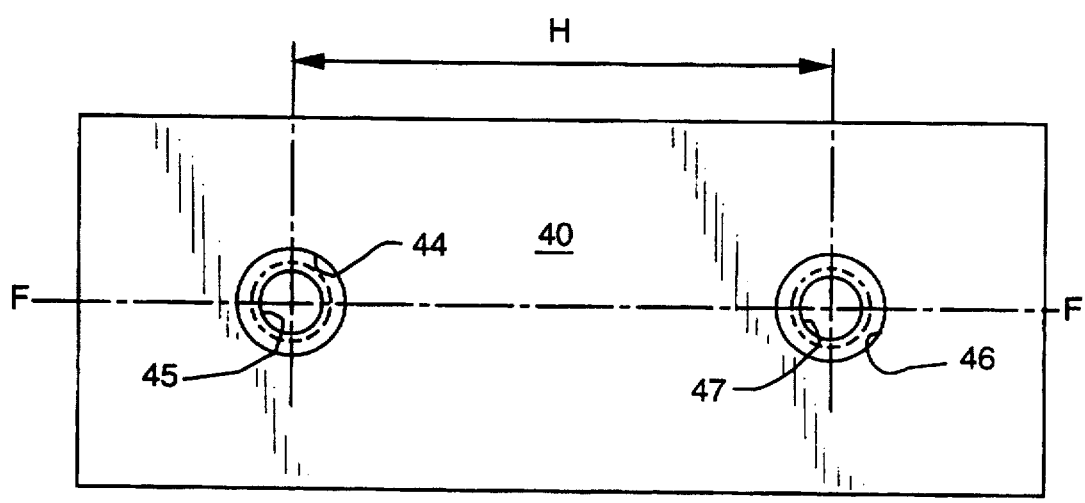
FIG. 8 is a plan view of the object depicted in FIGS. 5 and 7.

A "first" receiving bore 44 having a "first" axis "E—E" is provided in the object 40 such that axis "E—E" extends substantially perpendicularly through a longitudinal reference axis "F—F" provided on the planar surface 42 of the object 40. See FIGS. 7 and 8. A "second" receiving bore 46 that has an axis "G—G" is provided in object 40 a second predetermined distance "H" along the reference axis "F—F" from the first receiving bore 44. Thus, in this embodiment, axes "E—E" and "G—G" are preferably substantially parallel to each other and they are preferably substantially perpendicular to axis "F—F".

To locate the member 10 on the planar surface 42 of the object 40, the member 10 is so positioned such that the mating surface 12 is brought into confronting relationship with the planar surface 42 of the object to thereby enable the first protrusion 14 and the second protrusion 20 to be simultaneously inserted into the first receiving bore 44 and the second receiving bore 46, respectively. To removably attach the member 10 to the object 40, the first receiving bore 44 is provided with a "first" threaded portion 45 and the second receiving bore 46 is provided with a "second" threaded portion 47. A "first" fastening member, preferably a capscrew 48, is inserted through first axial bore 16 to be threadedly engaged with the first threaded portion 45. Likewise, a second fastening member, preferably a capscrew 49, is inserted through a second axial bore 21 that extends through the member 10 and the protrusion 20 to be threadedly engaged with the second threaded portion 47 of second receiving bore 46. The skilled artisan will appreciate, however, that other suitable fasteners such as, for example, bolts, pins, etc. may also be used.

The skilled artisan will also appreciate that the positioning accuracy of the member 10 relative to the object 40 is dependent upon the position of the protrusions (14, 20) on the member 10 and the positions of the first and second receiving bores (44, 46) in the object 40. More specifically, the location of protrusion 14 and the location of the first receiving bore 44 establish the location of member 10 relative to the reference axis "F—F" on the object 40. Of course, each of those elements (i.e., the protrusion 14 and the first receiving bore 44) have a tolerance, the magnitude of which may be dictated by such factors as (i) the ultimate acceptable degree of positioning accuracy required between the member 10 and the object 40 and (ii) the accuracy limitations and costs associated with machining those elements to the tolerances necessary to achieve such positioning accuracy. The skilled artisan will further understand that the positions of protrusion 20 and the corresponding second receiving bore 46 relative to protrusion 14 and the first receiving bore 44 serve to define the degree of rotational accuracy that member 10 will have about axis "E—E". See FIG. 7. It has been found, however, that when the second protrusion 20 is so angularly arranged on the mating surface 12 of the member 10 such that a line "I—I" connecting the centers of the arcuate surfaces (22, 24) is perpendicular to the reference axis "F—F" when the protrusions (14, 20) are received in bores (44, 46), respectively, the distances "B" and "H" can vary up to about four times the amount such distances could normally vary if protrusion 20 had a circular cross-sectional shape.

As was previously discussed hereinabove, the present positioning method is well adapted for positioning and affixing a stationary clamping member onto the base member of a workholding apparatus. For example, as described below and illustrated in FIGS. 9–15, the present invention may be used in connection with a vise-like workholding device, generally designated as 50, that is adapted to securely restrain a first workpiece 52 and a second workpiece 54 during various machining operations.

The basic structure of the workholding device 50 is similar to the workholding apparatus described in U.S. Pat. No. 5,022,636, issued Jun. 11, 1991, entitled "Workholding Apparatus", the disclosure of which is herein incorporated by reference. As such, in the present Detailed Description Of The preferred Embodiments, the basic structure of the workholder 50 will be described in general terms, it being understood that the particular details of the workholder 50 construction, with the exception of those features which are described hereinbelow forming this embodiment of the present invention, may be gleaned from a review of that patent.

Figure 9:
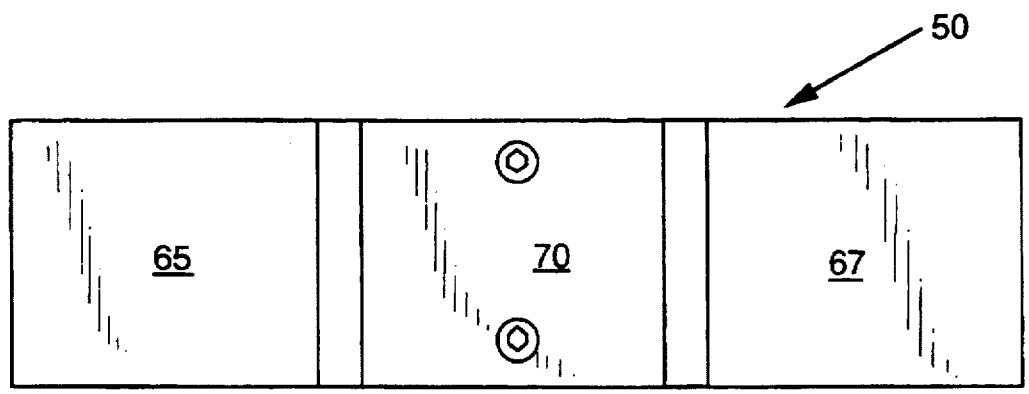
FIG. 9 is a plan view of a precision vise-like workholding device with which the present invention may be used.
Figure 10:
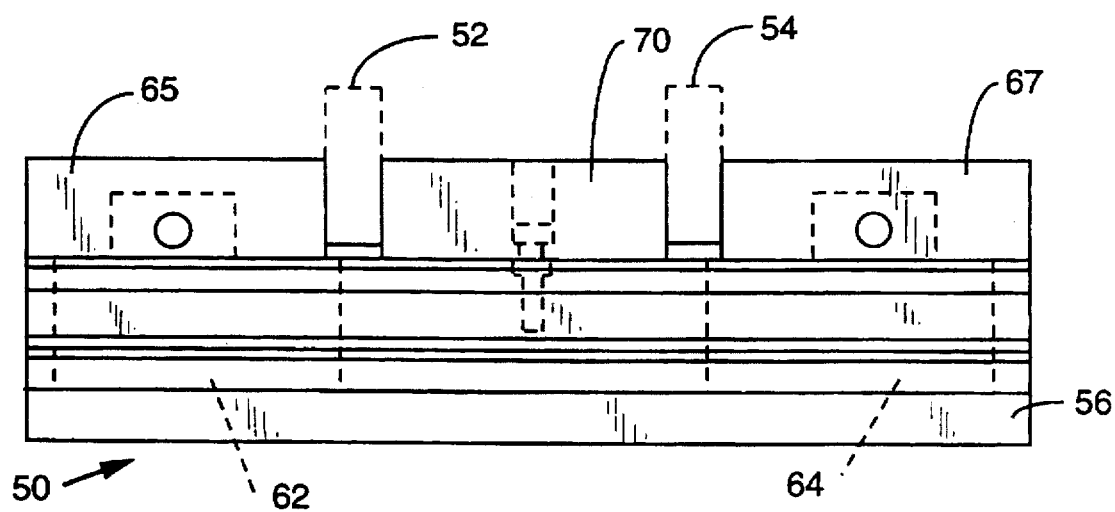
FIG. 10 is side elevational view of the workholding device of FIG. 9.
Figure 12:
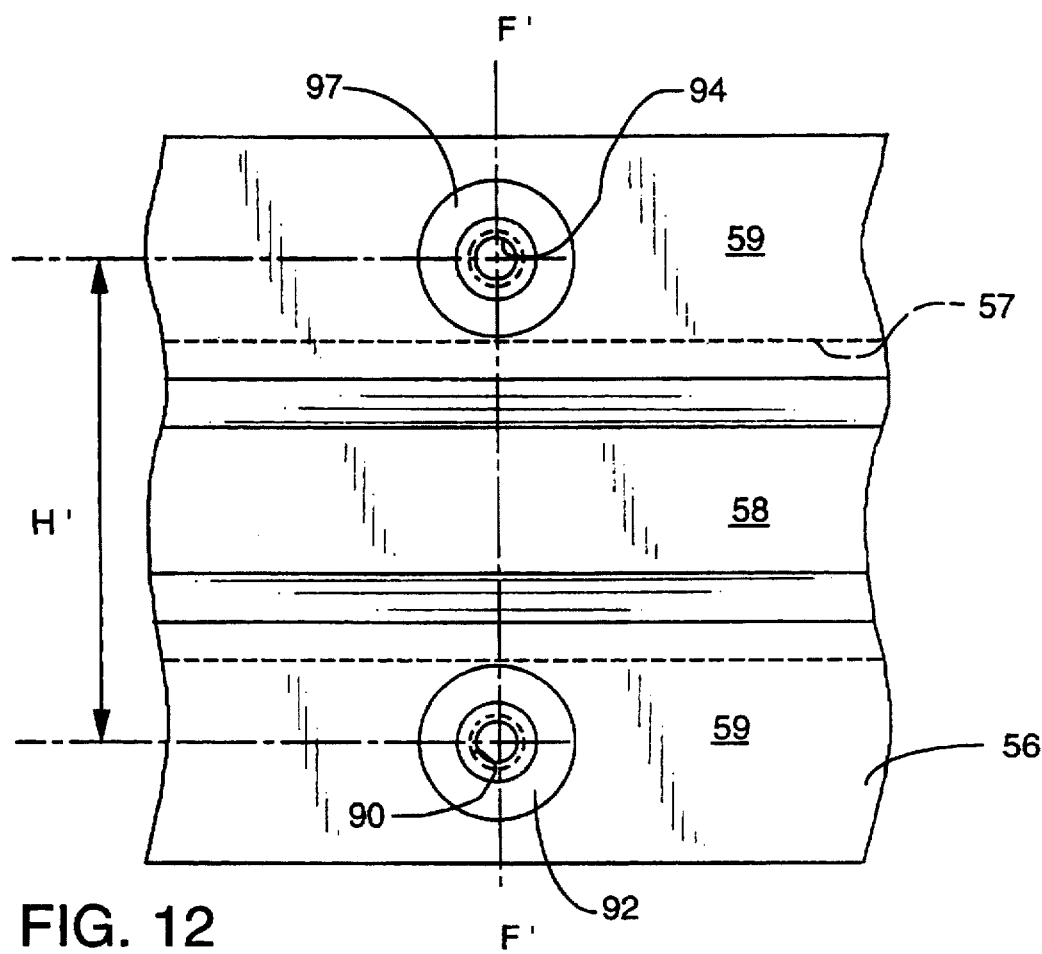
FIG. 12 is a partial plan view of the base of FIG. 11.

The vise-like workholding device 50 generally comprises a base member 56 which is an elongated metallic structure typically fabricated from a high strength aluminum material. As most particularly shown in FIG. 11, a cavity 57 is machined along the longitudinal axis of the base member 56 and defines a slot 58 having two longitudinally extending side rail members 59. In addition, a clamping assembly, generally designated as 60 is provided for movement within the cavity 57 and slot 58. The clamping assembly 60 includes first and second slide members (62, 64) which are slidably received within the slot 58. As shown in FIGS. 9 and 10, a workholding jaw portion 65 is preferably attached to the first slide member 62 and a second workholding jaw portion 67 is preferably attached to the second slide member 64. The workholding jaw portions 65 and 67 may be similar to those workholding jaw portions disclosed in U.S. Pat. No. 5,025,427 entitled "Quick Change Head For Precision Machine Vise" the disclosure of which is herein incorporated by reference. The clamping assembly 60 also includes a screw shaft 66 that is received within the slot 58 in the base member 56. The screw shaft 66 is operably attached to the first and second slide members (62, 64) such that rotational movement of the screw shaft 66 causes the first and second slide members (62, 64) to be selectively moved along slot 58.

A central fixed jaw member 70 is also adapted to be attached to the base 56 between the jaw portions 65 and 67 such that the movable slide members 62 and 64 may move toward and away from the central fixed jaw member 70 to clamp workpieces 52 and 54 therebetween. For example, when the screw shaft 66 is rotated, the first movable slide member 62 is moved relative thereto, thereby causing the first workholding jaw portion 65 to move toward the central jaw member 70 to withhold a first part 52 therebetween. In addition, the rotation of the screw shaft 66 and its movement relative to the first movable slide member 62 causes the second movable slide member 64 to move the second workholding jaw portion 67 toward the fixed central jaw member 70 to engage and restrain a second part 54 therebetween. Because the central jaw member 70 must be accurately positioned and attached to the side rail members 59, the positioning apparatus of the present invention is well-suited to accomplish that task while permitting the central fixed jaw member 70 to be easily removed from the base 56 should it become worn or damaged.

Figure 13:
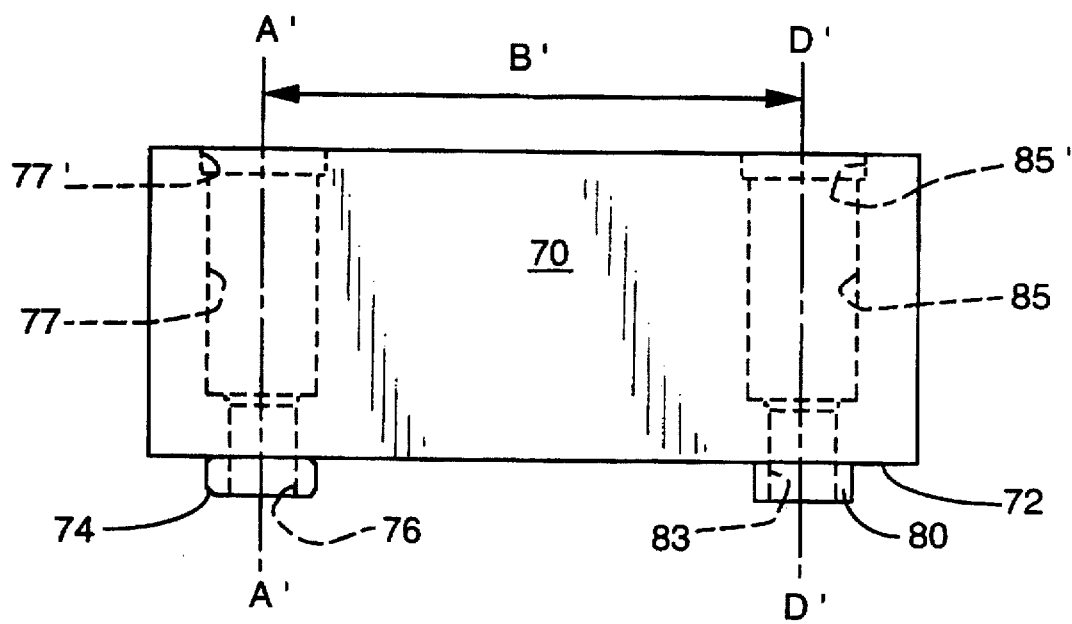
FIG. 13 is an elevational view of the center jaw of the workholding device depicted in FIGS. 9 and 10.
Figure 14:
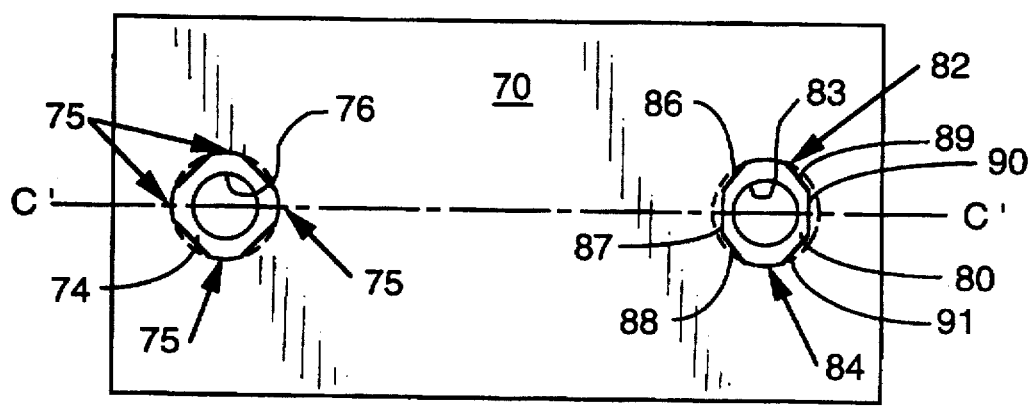
FIG. 14 is a bottom view of the center jaw of FIG. 13.
Figure 15:
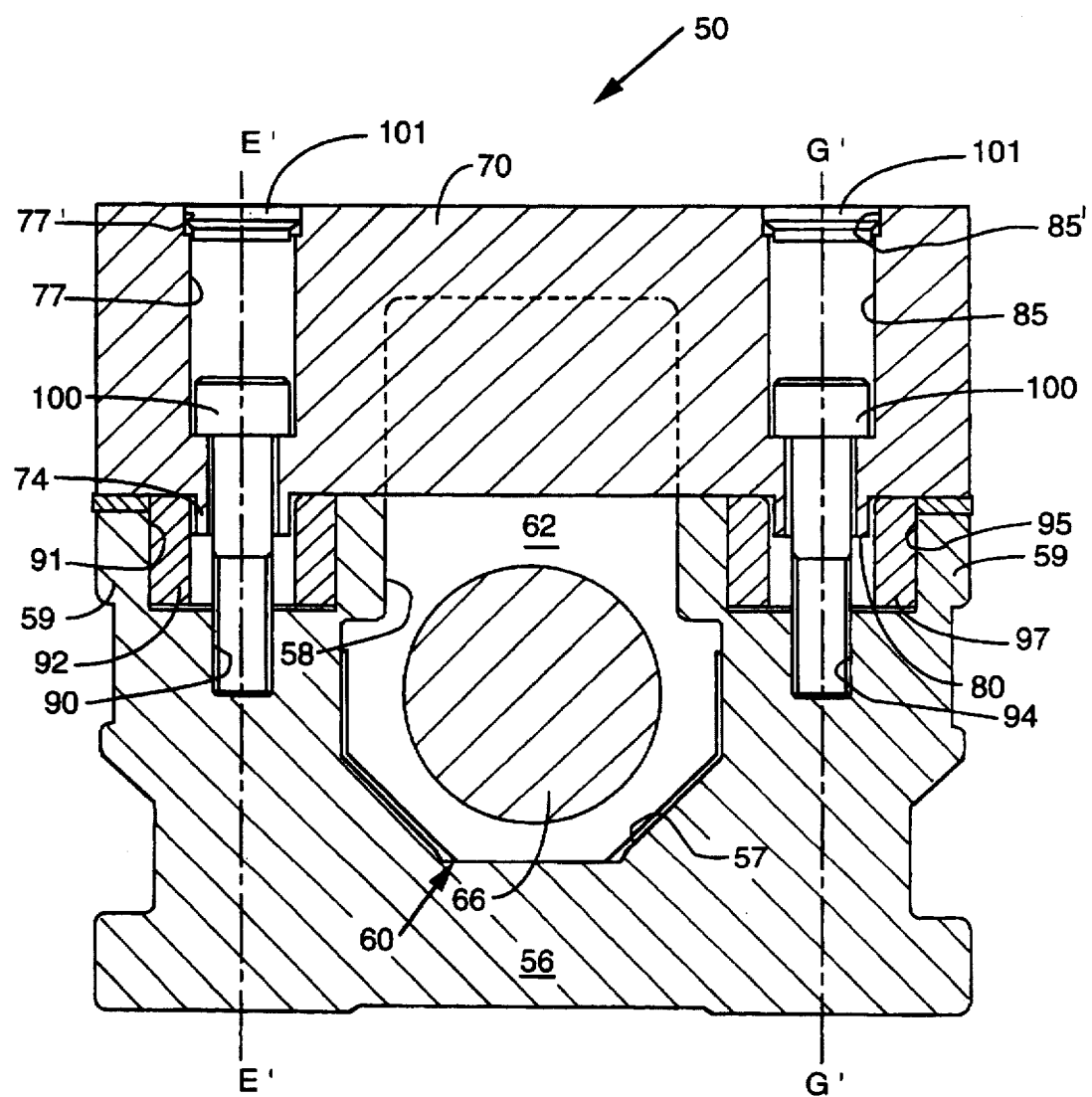
FIG. 15 is a cross-sectional assembly view of the viselike workholder depicted in FIGS. 9 and 10 with some of the elements thereof depicted in full view to better illustrate the apparatus of the present invention.

More specifically, as shown in FIGS. 13-15, the cenfixed fixed jaw member 70 has a mating surface 72 that is adapted to be received on the rail portions 59 of the base 56. A first protrusion 74, preferably having the cross-sectional shape depicted in FIG. 14, is formed in the mating surface 72 such that it protrudes or extends therefrom. As can be seen in FIG. 14, protrusion 74 is preferably provided with four, spaced-apart contact arcs 75 using the fabricating methods described hereinbelow. Also, a first bore 76 is provided through the center jaw 70 at a known location such that it is substantially coaxially aligned with the first protrusion 74 along axis "A'—A'" and extends therethrough in the manner illustrated in FIG. 13. In addition, a first counterbore 77 and a second counterbore 77'are preferably provided in the center jaw 70 such that they are also coaxially aligned with bore 76 on axis "A'—A'".

Spaced a "first" predetermined distance (generally designated as distance "B'") along a common axis "C'—C'" on the mating surface 72 from protrusion 74 is a second protrusion 80 that has an axis "D'—D'" that is substantially parallel to axis "A'—A'" of protrusion 74. In a preferred embodiment, arcuate surfaces (82, 84), each preferably about 20 degrees in length, and in no event greater than 179 degrees in length, are formed diametrically opposite each other as shown in FIG. 14. Interconnected non-arcuate or arcuate surfaces (86, 87, 88, 89, 90, 91), each being closer to axis "D'—D'" than the arcuate surfaces (82, 84), are preferably provided intermediate the arcuate surfaces (82, 84) as shown in FIG. 14. The skilled artisan will appreciate, however, that other non-arcuate or arcuate intermediate surface arrangements may also be successfully used. Also, a first bore 83 is provided through the center jaw 70 such that it is substantially coaxially aligned with the second protrusion 80 along axis "D'—D'" and extends therethrough in the manner illustrated in FIG. 13. In addition, a first counterbore 85 and a second counterbore 85'are preferably provided in the center jaw 70 such that they are also coaxially aligned with bore 83 on axis "D'—D'".

It has been discovered that the protrusions (74, 80) can be advantageously machined into the center jaw 70 as follows. Two protrusions as described above, one round in cross-section and one with only two small arcuate surfaces, corresponding to the protrusions (74, 80) are first machined into the jaw member 70 in their predetermined locations using conventional machining techniques. The outer diameters of these round protrusions may be as much as approximately 0.004" larger than the ultimate desired diameter for each protrusion (74, 80). Thereafter, a die plate fabricated from material that is harder than the jaw member 70 material and having two round apertures that will provide the final desired sizes and center distances for the protrusions (74, 78) is pressed onto the protrusions to "shave" off excess material therefrom and ultimately achieve the desired protrusion size and spacing. To achieve a preferred protrusion diameter accuracy of approximately ±0.0001", it has been found that it is desirable to press the die plate onto the round protrusions at least three successive times. Such manufacturing method is relatively inexpensive when compared to other conventional machining methods capable of achieving similar accuracies.

To attach the center jaw 70 to the base 56, a "first" threaded receiving bore 90, having a "first" axis "E'—E'", is provided in one rail 59 of base 56 such that axis "E'—E'" preferably extends substantially perpendicularly through a reference axis "F'—F'" provided on the base 56. See FIGS. 11 and 12. A "second" receiving bore 94 that has an axis "G'—G'" is provided in the base 56 a second predetermined distance "H'" along the reference axis "F'—F'". Thus, in this embodiment, axes "E'—E'" and "G'—G'" are preferably substantially parallel to each other and they are preferably substantially perpendicular to axis "F'—F'".

Figure 11:
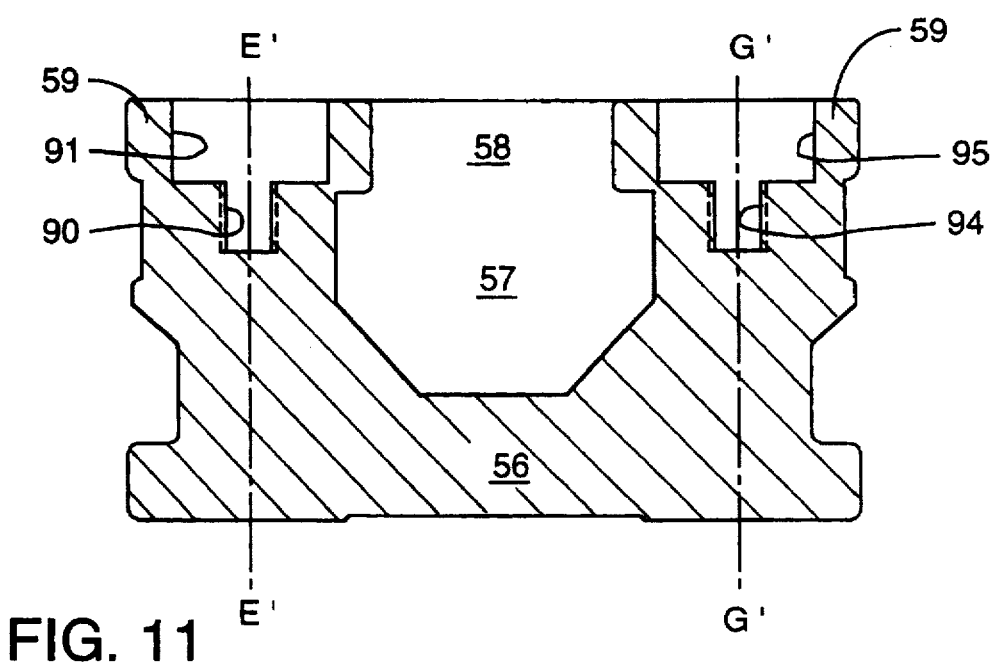
FIG. 11 is a cross-sectional elevational view of the base member of the workholding device depicted in FIGS. 9 and 10.

As can also be seen in FIGS. 11 and 15, a counterbore 91 is coaxially aligned with bore 90 along axis "E'—E'" and is adapted to receive a hollow bushing 92 therein. Similarly, a counterbore 95 is coaxially aligned with bore 94 along axis "G'—G'" and is adapted to receive hollow bushing 97 therein. The bushings (92, 97) are preferably fabricated from hardened steel and are preferably retained within the corresponding counterbores (91, 95) by virtue of an interference fit created between the outer diameter of each bushing and the corresponding counterbore (91, 95). However, those of ordinary skill in the art will appreciate that bushings (92, 97) may be fabricated from a variety of other suitable materials and may be attached to the side rails 59 by any suitable fastening means, or bores without brushings could be provided in the side rails.

To locate the center jaw 70 on the rails 59 of base 56, the center jaw 70 is so positioned such that the mating surface 72 thereof is brought into confronting relationship with the rails 59 of base 56 to enable the first protrusion 74 and the second protrusion 80 to be simultaneously inserted into bushings (92, 97), respectively. To removably attach the center jaw 70 to the rails 59 of base 56, capscrews 100, are preferably inserted through bores (77, 77') and bores (85, 85') and bushings (92, 97) to threadedly engage threaded bores (90, 94). See FIG. 15. Also, to prevent chips and debris from collecting in counterbores (77, 85), resilient bore plugs 101 are preferably removably inserted into counterbores (77', 85').

Thus, it is evident from the foregoing discussion, that the present invention is well-suited for positioning and fastening a jaw member to the base of a vise-like workholding apparatus. As mentioned above, the present invention enables the jaw member to be removed and replaced should it become damaged or worn. The protrusions of the present invention are machined onto the removable jaw member preferably by the fabricating method described hereinabove. When compared to the locating bushing arrangement disclosed in U.S. Pat. No. 4,968,012 to Haddad et al., which requires very precise machining of the bores in the removable support member and the outer surfaces of the corresponding bushings, the present invention serves to provide a more economical method to accurately removably attach the jaw member to the base of a vise-like workholding apparatus. Thus, numerous other jaw members of various sizes and shapes can be economically manufactured and stored for a variety of other workholding applications.

As such, the present invention provides solutions to the aforementioned problems associated with precisely positioning a member on the planar surface of an object and, in particular, to the positioning problems commonly associated with workholding vises and similar apparatuses. It will be understood, however, that various changes in the details, materials and arrangements of parts which have been herein described and illustrated in order to explain the nature of the invention may be made by those skilled in the art within the principle and scope of the invention as expressed in the appended claims.

What is claimed is:

1. A locting system, comprising:

an object having a planar surface with a reference axis thereon, said object having a first receiving bore in said planar surface, first receiving bore having a first central axis at a known location extending substantially perpendicularly through said reference axis, said object having a secend receiving bore in the planar surface thereof, said second receiving bore having a ssecond central axis spaced from said first central axis at a first predetermined distance on said reference axis and extending substantially perpendicularly through said reference axis; known location extending substantially perpendicularly through said reference axis;

a member adapted to be attached to said object within a predetermined degree of positioning accurace relative to said reference axis and having a first locating protrusion intergrally formed in a mating surface of the member and extending therefrom, said first locating protrusion having a substantially round cros-sectional shape sized for insertion into said first receiving bore, said first locating protrusion further having a first axial center and a first axial bore extending therethrough, said member having a second locating protrusion integrally formed in said mating surface thereof and having a second axial center that is spaced a second predetermined distance from said first axial center of said first locating protrusion such that when said first locating protrusion is inserted into said first receiving bore, said second locating protrusion is received in said second receiving bore, said second locating protrusion further having a second axial bore extending therethrough and a non-circular cross-sectional shape configured such that it is received in said second receiving bore although the difference between said first and second distances differs from said predetermined degree of accuracy to achieve said predetermined degree of positioning accuracy of the object relative to the reference axis on the planar surface; and fastening members inserted in said first and second axial bores to fasten said member to said object when first and second locating protrusions are simultaneously received in said first and second receiving bores, respectively.

2. The locating system claim 1 wherein said second locating protrusion has two diametrically opposite arcuate locating surfaces whose centers are along a line perpendicular to said reference axis and two spaced-apart intermediate surfaces extending between said diametrically opposite arcuate locating surfaces.

3. The locating system of claim 1 wherein said first locating protrusion has at least three spaced-apart arcuate contact surfaces thereon.

4. The locating system of claim 1 wherein said first and second receiving bores have threaded portions therein and wherein said fastening members comprise a first cap screw having a threaded portion adapted to extend through said first axial bore and threadedly engage said threaded portion of said first receiving bore and a second cap screw having a threaded portion adapted to extend through said second axial bore and threadedly engage said threaded portion of said second receiving bore.

5. The locating system of claim 1 wherein said first and second receiving bores are provided in first and second bushings, respectively, that are received in the planar surface of the object.

6. The locating system of claim 1 wherein said object having a planar surface is a workholding device and said object is a stationary clamping member adapted to be attached thereto.

7. A locating system, comprixing:

a vise-like workholder haveing a base, said base having a transverse reference axis thereon;

a jaw member attachable to the base of a vise-like workholder within a predetermined degree of accuracy relative to said transverse reference axis on said base;

a first receiving bore in a known location in said workholder base, said first receiving bore having a first central axis extending substantially perpendicularly through said transverse reference axis, said first receiving bore having a first threaded portion;

a second receiving bore in said workholder base, said second receiving bore having a second central axis spaced from said first central axis of said first receiving bore on said transverse reference axis a first predetermined distance and extending substantially perpendicularly through said transverse reference axis, said second receiving bore having a second threaded portion;

a first locating protrusion integrally formed in a mating surface of said jaw member and extending therefrom, said first locating protrusion having a four spaced-apart arcuate contact surfaces and being sized for insertion into said first receiving bore, said first locating protrusion further having a first axial bore extending therethrough;

a second locating protrusion formed in the mating surface of the jaw member and having a second axial center that is spaced a second predetermined distance from said first axial center of said first locating protrusion on said reference axis such that when said first locating protrusion is inserted into said first receiving bores, said second locating protrusion is received in said second receiving bore, said second locating protrusion further having a second axial bore extending therethrough and a non-circular cross-sectional shape configured for insertion into said second receiving bore althouth the difference between said first and second distances differ from said predetermined ddegree of accuracy and said predetermined degree of positioning accuracy of said jaw member with respect to said reference axis on saidk base member is achieved;

a first fastener having a primary threaded portion sized to extend through said first axial bore and selectively threadedly engage said first threaded portion of said first receiving bore; and a second fastener having a secondary threaded portion sized to extend through said second axial bore and selectively threadedly engage said second threaded portion of said second receiving bore.

8. The locating system of claim 7 further comprising:

a first bushing having a primary axial bore extending therethrough, said first bushing attached to said workholder base such that said primary axial bore is substantially coaxially aligned with said first receiving bore; and a second bushing having a secondary axial bore extending therethrough, said second bushing attached to said workholder base such that the secondary axial bore is substantially coaxially aligned with said second receiving bore.

9. The locating system of claim 7 wherein said second locating protrusion has two diametrically opposite arcuate locating surfaces whose centers are along a line perpendicular to said transverse reference axis and two spaced-apart intermediate surfaces extending between said diametrically opposite arcuate locating surfaces.

10. The locating system of claim 7 wherein said first locating protrusion has at least three spaced-apart arcuate contact surfaces thereon.

* * * * *

UNITED STATES PATENT AND TRADEMARK OFFICE
CERTIFICATE OF CORRECTION

PATENT NO.  : 5,713,118
DATED       : February 3, 1998
INVENTOR(S) : Swann et al.

It is certified that error appears in the above-identified patent and that said Letters Patent is hereby corrected as shown below:

Column 1,
Line 44, after "the", delete "clearances" and replace therewith -- clearance --.
Line 45, after "the", delete "in member 212 bore" and
replace therewith-bore in member 212--.
Line 60, after "distance", delete "X" and replace therewith -- "X'" --.
Line 61, after "distance", delete "Y" and replace therewith -- "Y'" --.

Column 4,
Line 52, after "is", delete "a cross-sectional" and replace therewith -- an end --.

Column 5,
Line 19, after "distance", delete "as".

Column 9,
Line 22, delete "locting" and replace therewith -- locating --.
Line 25, after "surface", insert -- said --.
Line 28, delete "secend" and replace therewith -- second --.
Line 29, delete "ssecond" and replace therewith -- second --.
Line 30, after "axis", delete "at".
Lines 32-33, delete "known location extending substantially perpendicularly through said reference axis;".
Line 35, delete "accurace" and replace therewith -- accuracy --.
Line 37, delete "intergrally" and replace therewith -- integrally --.
Line 40, delete "cros-sectional" and replace therewith -- cross-sectional --.
Line 61, after "when", insert -- said --.
Line 65, after "system", insert -- of --.

UNITED STATES PATENT AND TRADEMARK OFFICE
CERTIFICATE OF CORRECTION

PATENT NO.   : 5,713,118
DATED        : February 3, 1998
INVENTOR(S)  : Swann et al.

It is certified that error appears in the above-identified patent and that said Letters Patent is hereby corrected as shown below:

Column 10,
Line 19, after "the", delete "object" and replace therewith -- member --.
Line 22, after "said" delete "object" and replace therewith -- member --.
Line 24, delete "comprixing" and replace therewith -- comprising --.
Line 25, delete "haveing" and replace therewith -- having --.
Line 27, after "to", delete "the" and replace therewith -- said -- and after "of" delete "a" and replace therewith -- said --.
Line 45, after "having", delete "a".
Line 50, after "protrusion", insert -- integrally --.
Line 51, after "member", delete "and".
Line 62, delete "ddegree" and replace therewith -- degree --.
Line 65, delete "saidk" and replace therewith -- said --.

Signed and Sealed this

Twenty-eighth Day of August, 2001

*Attest:*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO. : 5,713,118
DATED : February 3, 1998
INVENTOR(S) : Swann et al.

It is certified that error appears in the above-identified patent and that said Letters Patent is hereby corrected as shown below:

Column 7,
Line 27, after "the", delete "cenfixed" and replace therewith -- central --.

Signed and Sealed this

Eleventh Day of December, 2001

Attest:

NICHOLAS P. GODICI
Attesting Officer   Acting Director of the United States Patent and Trademark Office